US009576360B2

(12) United States Patent
Schormans et al.

(10) Patent No.: US 9,576,360 B2
(45) Date of Patent: Feb. 21, 2017

(54) METHOD AND APPARATUS FOR QUANTITATIVE MEASUREMENTS ON SEQUENCES OF IMAGES, PARTICULARLY ANGIOGRAPHIC IMAGES

(71) Applicant: PIE MEDICAL IMAGING BV, Maastricht (NL)

(72) Inventors: Ron Schormans, Heerlen (NL); Jean-Paul Aben, Limbricht (NL); Rianne Reinartz, Neerbeek (NL)

(73) Assignee: PIE MEDICAL IMAGING BV, Maastricht (NL)

( * ) Notice: Subject to any disclaimer, the term of this patent is extended or adjusted under 35 U.S.C. 154(b) by 0 days.

(21) Appl. No.: 14/428,046

(22) PCT Filed: Mar. 26, 2013

(86) PCT No.: PCT/EP2013/056426
§ 371 (c)(1),
(2) Date: Mar. 13, 2015

(87) PCT Pub. No.: WO2014/040758
PCT Pub. Date: Mar. 20, 2014

(65) Prior Publication Data
US 2015/0262358 A1    Sep. 17, 2015

(30) Foreign Application Priority Data

Sep. 17, 2012   (EP) .................. 12184678

(51) Int. Cl.
*G06K 9/00*       (2006.01)
*G06T 7/00*       (2006.01)
*A61B 5/02*       (2006.01)

(52) U.S. Cl.
CPC ... *G06T 7/0016* (2013.01); *G06T 2207/10016* (2013.01); *G06T 2207/10116* (2013.01);
(Continued)

(58) Field of Classification Search
USPC .............. 382/100, 103, 106–107, 128–134, 154,382/162–166, 168, 173, 181, 192, 209, 224,382/232, 254, 274, 276, 285–291, 305, 312; 378/4, 21; 600/485, 438, 447, 407
See application file for complete search history.

(56) References Cited

U.S. PATENT DOCUMENTS 5,879,307 A * 3/1999 Chio ................. A61B 5/02116
600/485
RE38,159 E     6/2003 Chio et al.
(Continued)

FOREIGN PATENT DOCUMENTS

EP         1493382        1/2005

OTHER PUBLICATIONS

"Videodensitometric Quantitation of Aortic Regurgitation by Digital Subtraction Aortography Using a Computer-Based" No.Meth d9, pagesAnalyzing753-756,Time-DensitYoctober 1,Curyes 1986 Klein L.W. et al., American Journal of Cardiology, Oct. 1, 1986, vol. 58.*

(Continued)

*Primary Examiner* — Seyed Azarian
(74) *Attorney, Agent, or Firm* — Gordon & Jacobson, P.C.

(57) ABSTRACT

Method for assessing a regurgitant flow through a valve into a moving object from a sequence of consecutive image frames of such object, which images are timely separated by a certain time interval, the method comprising the following steps: a) identifying in the images the object of interest; b) augmenting the images to compensate for protocol intensity variation and/or motion and/or background; c) making a time-analysis of augmented images to obtain time-density curve or curves, wherein time-density curves represent a time-evolution of pixel brightness; d) determining a plurality (Continued)

of parameters related to such time-density curve or curves; e) weighting such parameters to provide indications on the regurgitant flow. A corresponding apparatus and computer program are also disclosed.

25 Claims, 8 Drawing Sheets

(52) U.S. Cl.
CPC .............. *G06T 2207/20224* (2013.01); *G06T 2207/30048* (2013.01); *G06T 2207/30104* (2013.01)

(56) References Cited

U.S. PATENT DOCUMENTS

| | | | |
|---|---|---|---|
| 6,719,697 B2 | 4/2004 | Li | |
| 2003/0153823 A1* | 8/2003 | Geiser | G06T 7/0012 600/407 |
| 2010/0056921 A1* | 3/2010 | Rafter | A61B 8/06 600/447 |
| 2013/0144161 A1* | 6/2013 | Wang | A61B 8/065 600/438 |

OTHER PUBLICATIONS

"Videodensitometric Quantitation of Aortic Regurgitation by Digital Subtraction Aortography Using a Computer-Based Method Analyzing Time-Density Curves", Klein L.W. et al., American Journal of Cardiology, Oct. 1, 1986, vol. 58, No. 9, pp. 753-756, Oct. 1, 1986.*
"EKG-Gated Digital Subtraction Angiography in the Detection of Pulmonary Emboli", Mohammed Hirji et al., Radiology, vol. 152, pp. 19-22, 1984.
"Numerical and Statistical Methods for Bioengineering: Applications in MATLAB", Michael R. King et al., Chapter 6, ISBN 9780521871587, Cambridge University Press, 2011.
"Quantitation of Aortic Regurgitation by Computer Analysis of Digital Subtraction Angiography.", Grayburn P.A. et al., Journal of the American College of Cardiology, Nov. 1987, vol. 10, No. 5, pp. 1122-1127.
"Quantitation of Experimental Aortic Regurgitation by Roentgen Videodensitometry", Von Bernuth G. et al., American Journal of Cardiology, Feb. 1, 1973, vol. 31. No. 2, pp. 265-272.
"Quantification of Mitral Regurgitation in the Cardiac Catheterization Laboratory with Contrast Echocardiography.", Buckley R.S. et al., American Heart Journal, Jun. 2000, vol. 139, NR. 6 pp. 1109-1113.
"Quantification of Aortic Regurgitation After Balloon Aortic Valvuloplasty Using Videodensitometric Analysis of Digital Subtraction Aortography", Davidson, C.J. et al., American Journal of Cardiology, vol. 63, No. 9, Mar. 1, 1989, pp. 585-588.
"Detection and Measurement of Experimentally Produced Aortic Regurgitation by Means of Indicator-Dilution Curves Recorded from the Left Ventricle", Egas Armelin et al., Circulation Research, vol. 12, 1963, pp. 269-290.
"Noninvasive Evaluation of Mitral Regurgitation by Analysis of Left Atrial Signal Loss in Cine Magnetic Resonance", Pflugfelder P.W. et al., American Heart Journal, vol. 117, No. 5, May 1, 1989, pp. 1113-1119.
"Valvular Heart Disease", Wang, A. et al., Humana Press Inc., 2009.
"Automated Quantification of Aortic Regurgitant Volume and Regurgitant Fraction Using the Digital Colour Doppler Velocity Profile Integration Method in Patients with Aortic Regurgiation", Miyake, Y. et al., Heart, Nov. 2002, vol. 88 (5), pp. 481-484.
"Angiography of the Cardiac Valves: Normal, Diseased, and Postoperative Appearances", Chen, J.J. et al., RadioGraphics, 2009, vol. 29, pp. 1393-1412.
"MR Angiography of the Thoracic Aorta with an Electrocardiographically Triggered Breath-Hold Contrast-Enhanced Sequence", Arpasi, P.J. et al., RadioGraphics, 2000, vol. 20, 107-120.
"Standardized Endpoint Definitions for Transcatheter Aortic Valve Implantation Clinical Trials: A Consensus Report from the Valve Academic Research Consortium", Leon, M.B. et al., European Heart Journal, 2001, vol. 32, pp. 205-217.
"Quantitative Evaluation of Cineaortography in the Assessment of Aortic Regurgitation", Hunt, D., American Journal of Cardiology, 1973, vol. 31, pp. 696-700.
"X-Ray Image Segmentation Using Active Countour Model with Global Constraints", Jiang, Y. et al., IEEE Symposium of Computation Intelligence in Image and Signal Processing, 2007, pp. 240-245.
"Invariant Pattern Recognition Using Dual-Tree Complex Wavelets and Fourier Features", Chen, G.Y et al., 2005, Department of Computer Science and Operations Research, University of Montreal.
"Quantitative Left Ventricular Wall Motion Analysis: A Comparison of Area, Chord and Radial Methods", Gelberg, H. J. et al., Circulation, May 1979, vol. 59 (5), pp. 991-1000.
"Digital Subtraction Angiography: Feasibility of Densitometry Evaluation of Left Ventricular Volumes and Comparison to Measurements Obtained by the Monoplane Arc-Length-Method", Lehmkuhl, H. et al, Computers in Cardiology, 1993, pp. 29-32.

* cited by examiner

METHOD AND APPARATUS FOR QUANTITATIVE MEASUREMENTS ON SEQUENCES OF IMAGES, PARTICULARLY ANGIOGRAPHIC IMAGES

CROSS-REFERENCE TO RELATED APPLICATIONS

This application is a national stage application of PCT Patent Appl. No. PCT/EP2013/056426 filed on Mar. 26, 2013, which claims priority from EP Patent Appl. No. 12184678.6, filed on Sep. 17, 2012, both of which are hereby incorporated by reference in their entireties.

FIELD OF THE INVENTION

The invention relates to the technical field of medical imaging, particularly angiography imaging, although it can find application in any field where there is the need to quantify insufficiency of any valve closing the outlet of a moving organ such as in non destructive testing applications.

STATE OF THE ART

A condition which can occur in a patient is aorta regurgitation, also called aortic insufficiency (AI). When this occurs, the aortic valve of the heart does not fully close and causes the blood to flow in the reverse direction during ventricular diastole, from the aorta into the left ventricle. This leads to a higher workload and a higher pressure within the heart, increasing the chances of heart failure.

Aortic regurgitation is most commonly assessed by transthoracic echocardiography, which can provide two-dimensional views of the regurgitate jet by using Doppler, for example as described in Wang, A., Bashore, T. M., "*Valvular Heart Disease*", chapter 6, ISBN 1588299821, Humana Press Inc., 2009 or Miyake, Y., Hozumi, T., Mori, I., Sugioka, K., Yamamuro, A., Akasaka, T., Homma, S., Yoshida, K., Yoshikawa, J., "*Automated quantification of aortic regurgitant volume and regurgitant fraction using the digital colour Doppler velocity profile integration method in patients with aortic regurgitation*", In: Heart 88(5), November 2002, p. 481-484, as well as in US patent applications published with number 20010802080 "Non-invasive method and apparatus for diagnosing and monitoring aortic valve abnormalities, such as aortic regurgitation" and 20010794528 "Ultrasonic quantification of valvular regurgitant blood flow".

Although ultrasounds can be used to assess central aortic valve regurgitation, they are not very accurate in classification of aortic insufficiency due to the limited quality of the used ultrasound images and the acquisition which is operator dependent. Furthermore, they have some severe limitation in the accurate and reproducible assessment of paravalvular aortic regurgitation.

Paravalvular regurgitation is most frequently present in percutaneous aortic valve replacement or transcatheter aortic valve replacement procedures. Within these clinical procedures ultrasounds also suffer from an additional limitation: imaging artifacts due to the replaced aortic valve.

For diagnostic purposes, some experiments with CT and MR are reported in Chen, J. J, Manning, M. A., Frazier, A. A., Jeudy, J., White, C. S., "*CT Angiography of the cardiac valves: normal, diseased, and postoperative appearances*", In: RadioGraphics 29, 2009, p. 1393-1412 and Arpasi, P. J., Bis, K. G., Shetty, A. N., White, R. D., Simonetti, O. P., "*MR Angiography of the thoracic aorta with an electrocardiographically triggered breath-hold contrast-enhanced sequence*". In: Radiographics 20, 2000, p. 107-120, but those have the large disadvantage of no inter-operative application. CT and MR images would have to be acquired after the procedure, which would not only bring extra planning, additional costs, and stress for the patient, but would also drastically increase risks for the patient, as classification of potentially dangerous levels of AI severity are not done directly during the clinical procedure. Furthermore, additional CT images mean a higher dose of radiation received by the patient.

Assessment of aortic regurgitation during a catheterization procedure, for example a percutaneous aortic valve replacement procedure, is more and more performed by assessment of two-dimensional angiographic X-ray images in which contrast fluid is injected into the aortic root and observe the amount of contrast in the left ventricular heart chamber to examine the presence of aortic insufficiency. Several factors are used in practice to try to qualitatively classify the severity of the aortic insufficiency. More detailed guidelines on which classifications are presently based are defined in the heart journal Leon, M. B., Piazza, N., Nikolsky E., Blackstone, E. H., ea, "Standardized endpoint definitions for transcatheter aortic valve implantation clinical trials: a consensus report from the Valve Academic Research Consortium", In: European Heart Journal (2011) 32, p. 205-217 and in Hunt, D. et all, "Quantitative Evaluation of Cineaortography in the Assessment of Aortic Regurgitation, In: The American Journal of Cardiology (1973) 31, p. 696-700".

An example of the outcome of such qualitative classification is represented by the following table:

| Class | AI severity |
| --- | --- |
| 0 | No regurgitation |
| 1 | A little regurgitation |
| 2 | Moderate regurgitation; treatment required |
| 3 | Serious regurgitation; fast treatment required |
| 4 | Deadly regurgitation |

Currently the assessment of aortic insufficiency is primarily based on visual estimations of angiographic X-ray images. Visual estimation is highly subjective and not reproducible, and will lead to large inter and intra observer variability. Thus, reliability is limited, which can be dangerous to the patient.

Document by P. A. Grayburn, S. E. Nissen, J. L. Eliot, J. Evans, A. N. Demaria "Quantitation of Aortic Regurgitation by Computer Analysis of Digital Subtraction Angiography", JACC, Vol. 10, N. 5, November 1987:1122-7 proposes a method for calculation of the regurgitant fraction (RF) by processing time-intensity curves generated from digital substraction angiograms with the formula $$RF = \frac{A_{LV}/V_{LV}}{A_{AO}/V_{AO}}$$

where $A_{LV}$ and $A_{AO}$ are the areas under the left ventricular and aortic time-intensity curves, and $V_{LV}$ and $V_{AO}$ are the volumes of the left ventricular and aortic regions of interest.

This document goes in the right direction as it represents the first attempt to quantify AI. However, as it is limited to the calculation of a ratio between concentrations in the left ventricle and in the aorta, it is subjected to several limitations already pointed out by the same authors and summarized as follows:

1) The effects of streaming or inadequate mixing of blood and contrast could lead to error in the time-intensity curves;
2) the geometric assumption of a circular cross section of the left ventricular region of interest;

Besides these limitations others are present as well:

3) No attention is paid to the fact that some concentration of contrast fluid can be present in the vascular system due to previous sessions, therefore influencing the analysis;
4) The negative effect on the time-density curve caused by a variation of pixel intensities due to the used imaging protocol is not taken into account;
5) No correction is made for breathing motion or patient movement.

Hirji et al: "EKG-gated digital subtraction angiography in the detection of pulmonary emboli", Radiology, Vol 152, pages 19-22 for instance, compensates for cardiac motion by using a ECG-gated digital subtraction technique. In this approach digital subtraction is performed by subtracting R-wave gated images. This approach is used to compensate for cardiac motion. However, breathing motion and/or patient motion are not compensated. Because these motions are practical, using the gated digital subtraction will lead to errors in the time-intensity curves.

There is thus the need to improve the assessment of aortic regurgitation by computer analysis of angiography images.

SUMMARY OF THE INVENTION

It is thus an object of the present invention to provide a method for quantitatively assessing a regurgitant flow through a valve or constriction, particularly for quantitatively assessing aortic regurgitation from images that can be taken also during inter-operative application with a reduced procedure time and imaging related load for the patient.

The invention reaches the aim with a method for assessing a regurgitant flow through a valve into a moving object from a sequence of consecutive image frames of such object, which images are timely separated by a certain time interval, the method comprising the following steps:
a) identifying in the images the object of interest
b) augmenting the images to compensate for variations of pixel intensities due to the used imaging protocol and/or motion and/or background;
c) making a time-analysis of augmented images to obtain time-density curve or curves, wherein time-density curves represent a time-evolution of pixel brightness;
d) determining a plurality of parameters related to such time-density curve or curves;
e) weighting such parameters to provide indications on the regurgitant flow.

In the specific case of AI determination, the moving object is the left ventricle and the valve is the aortic valve while the image frames represent a cine of X-ray images of the left ventricle taken in sequence. In the more general case the valve is any valve or constriction located between a first organ and a second organ and configured to allow a forward flow of a fluid from the first organ, which represents the moving object of interest, to the second organ preventing the reverse flow from the second organ to the first organ. Regarding image acquisition, X-ray is the preferred solution, particularly angiographic X-ray, but also other imaging modalities can be used such as ultrasound, MRI, PET, SPECT or the like with or without contrast enhancement as long as they can provide a sequence of images of the object of interest.

The method advantageously comprises the step of stabilizing the movement of the object within the images, particularly by detecting at least one landmark on one image frame and following such landmark on the remaining image frames to correct the movement of the object. It may also comprise the step of detecting the contour of the object and/or detecting an area in at least one image of the frames to be used as a reference for time-density determination. Such reference area is typically located on a zone of the image where a forward flow from the object through the valve is identified.

The term augmenting is used in the present disclosure to refer to the processing of input images to provide new images wherein pixel intensity variations are compensated. Several types of compensations are possible, for example to correct pixel intensity variations due to protocol and/or to motion and/or background. A single compensation is possible, for example for intensity correction due to protocol or motion or background, but the combination of two or more compensation techniques is particularly advantageous for time-density curve calculation when aortic insufficiency is to be determined.

To such extent, the step of augmenting the images may comprise performing background correction before motion correction for the purpose of calculating time density curves for the areas of the object of interest, the other way round, i.e. motion correction before background correction, for the purpose of calculating time-density curve for the reference area.

Once a cine of image frames is available, it is generally useful to select a subset relating to a specific time interval to optimise the assessment of the regurgitant flow.

The regurgitant flow is advantageously identified when at least one time-density curve shows an increase in pixel densitometry followed by a decrease, such increase being related to the presence of a fluid leaking through the valve from the second organ into the first organ while such decrease is related to such fluid leaving the first organ during forward flow. This behaviour is typical of densitometry curves obtained from a sequence of X-ray images of an object where a contrast agent washes in and out: the more quantity of contrast agent is present, the more X-ray is absorbed. Contrast-induced imaging modalities undoubtedly help imaging flows, however the skilled person would appreciate that also images obtained without contrast enhancement can be used to obtain the same purpose as long as a variation in pixel intensities related to the presence of a flow can be appreciated.

The method advantageously comprises the step of determining parameters related to increases and decreases in the time-density curves such parameters comprising one or more parameter belonging to the group consisting in: steepness of each downfall, total densitometry variation, integrals under the densitometry curves, minimums and maximums, and so on.

The method can also comprise the step of determining as a parameter the time interval necessary to reach the same or a predetermined different level of pixel densitometry between a downfall and an uplift of a densitometry curve.

Another parameter may be the jet stream penetration of the regurgitant fluid that can be obtained by weighting the total pixel densitometry and/or time variation following a downfall and an uplift in areas having different distance from the valve, particularly by comparing the densitometry values over time in the different areas of the object of interest.

Still another parameter may be the regurgitation spread speed that can be obtained by measuring the steepness of the densitometry curves during downfall and/or uplift.

In case wash in and wash out are reverted in terms of downfall and uplift, i.e. the densitometry curves show a first uplift followed by downfall as in case of contrast echography, the same parameters can be determined upon reading the term uplift as downfall and vice versa.

Another parameter may be the duration of the presence of contrast agent in the different areas of the object of interest or the total amount of contrast agent present in the object of interest obtained by comparing the maximal densitometry in the different areas with the maximal densitometry in the reference area.

Still another parameter may be the steepness of one or more time density curves or the contrast changes during a heartbeat.

Another parameter may be the period contrast decay in the time density of one or multiple areas.

All or part of these parameters can be combined to provide a classification of the severity of the regurgitant flow.

It may be useful to divide the object of interest into areas from the closest to the valve to the furthest from the valve. This would allow to provide further indications on the regurgitant flow by weighting the parameters also in function of the area they refer to.

A correction of time-intensity curve or curves for previous contrast sessions is also possible to improve accuracy of the outcome of the analysis.

The invention also relates to a computer product directly loadable into the memory of a computer and comprising software code portions for performing the method as disclosed above when the product is run on a computer.

According to another aspect, the invention relates to an X-ray apparatus for acquiring two-dimensional images. The apparatus comprises means for obtaining a cine of consecutive image frames of the left ventricle of a patient, means for acquiring such cine of image frames after a trigger event, particularly the administration of a contrast agent in the aortic root. The apparatus can also comprise means for synchronizing with the cardiac cycle of the patient such as to acquire a certain number of heart beats after the trigger event. The apparatus further comprises processing means programmed for performing the method according to the invention to determine a classification of the regurgitant flow through the aortic valve.

The processing means could be a processor or processors dedicated to perform the method according to the invention or, in a particularly advantageous configuration, the same, or part of the same, processing means that subtends the main image acquisition functionalities of the machine thus obtaining a very compact and powerful apparatus.

Further improvements of the invention will form the subject of the dependent claims.

BRIEF DESCRIPTION OF THE DRAWINGS

The characteristics of the invention and the advantages derived therefrom will be more apparent from the following description of non-limiting embodiments, illustrated in the annexed drawings, in which.

DETAILED DESCRIPTION OF A PREFERRED EMBODIMENT

The invention is particularly advantageous in the quantification of aortic regurgitation based on two-dimensional (2D) angiographic film of X-ray images and it will be mainly disclosed with reference to this field. In this case the object of interest is the left ventricle and the valve is the aortic valve. It is however to be understood that the left ventricle, the aorta and the aortic valve can be substituted with any object in fluid communication through a shutting one-way valve.

The idea is to create a digital quantification of aortic insufficiency based on a two-dimensional (2D) angiographic film of X-ray images of a second or two (covering approximately three heart beats). This solution has the advantage of being both easily applicable during intervention (in contrast with methods like CT and MR), and gives more accurate, automatically generated and reproducible results than visual estimations. Only a single image film (a run of images shot under a single angle during a few seconds) is needed with this method, and such run will normally be shot during the intervention regardless, so no further time loss and exposure for the patient is caused.

In short, the method provides a reliable, reproducible automatically generated quantification of aortic insufficiency based on two-dimensional angiographic X-ray images, which have not been used before for such purpose. The new method for AI quantification, based on angiographic images, has also the advantage that it blends easily into the current clinical workflow. No extra images beyond what is already acquired during the procedure are required, the patient does not suffer from any additional stress, radiation, or additional procedures and the doctor does not need any additional imaging devices at the operation table.

Figure 1:
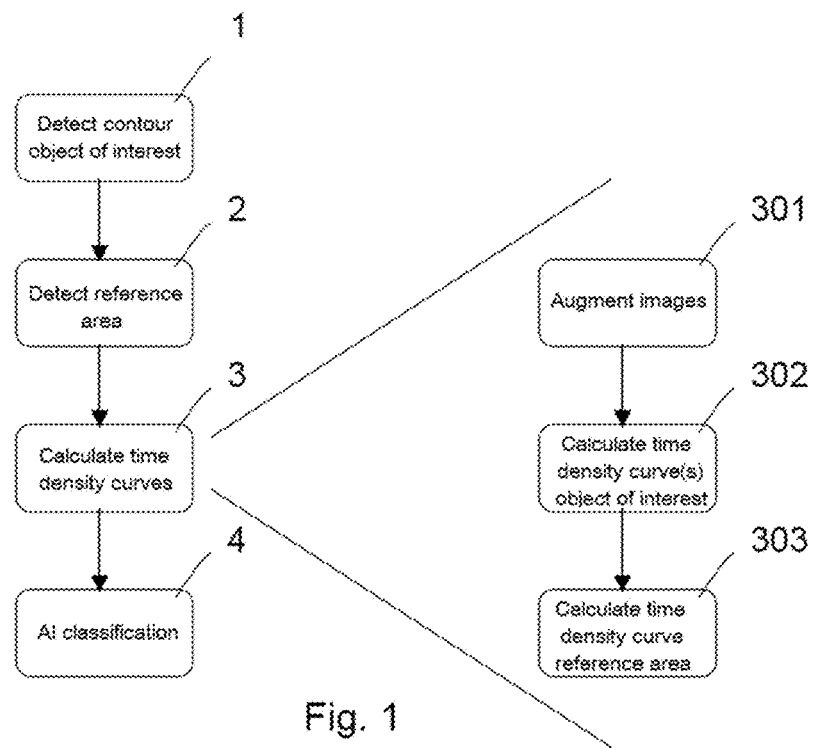
FIG. 1 is a flowchart of the invention main steps in a preferred embodiment.

With reference to the flowchart diagram of FIG. 1, an embodiment of the invention is now described.

For analysis, a sequence of angiographic X-ray images, covering approximately 3 heart beats, shot from a single position is used. The images cover the whole or a part of the left ventricle, the aortic valves, any stent inserted, and a small part of the aorta. Contrast should be present, and inserted in the aorta at the start of the first heart beat of the analysis. In case of regurgitation, this contrast agent will enter the left ventricle.

Based on the flowchart shown in FIG. 1, the analysis will go through the following steps.

1. Contour Detection of the Object of Interest

Figure 2:
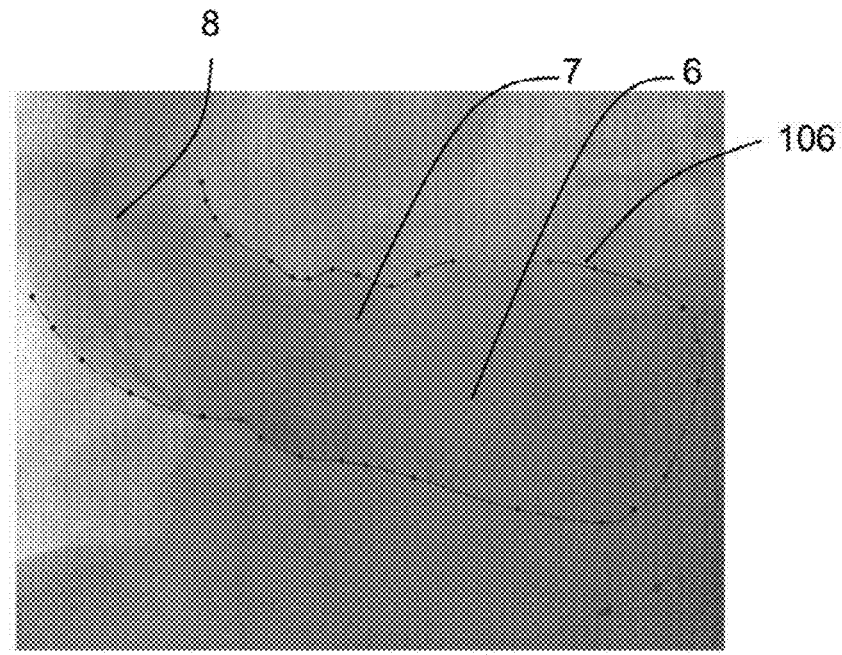
FIG. 2 shows an X-ray image of the left ventricle with contour indication.
Figure 3A:
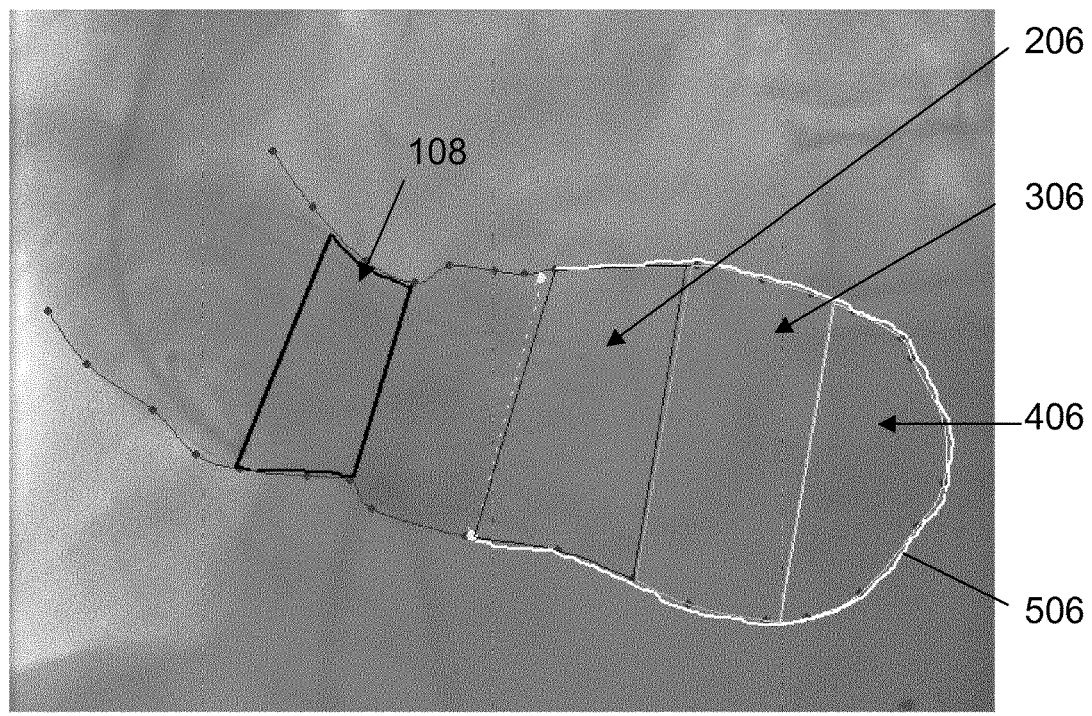
FIG. 3a shows another image of the left ventricle where also the aortic root is visible.
Figure 3B:
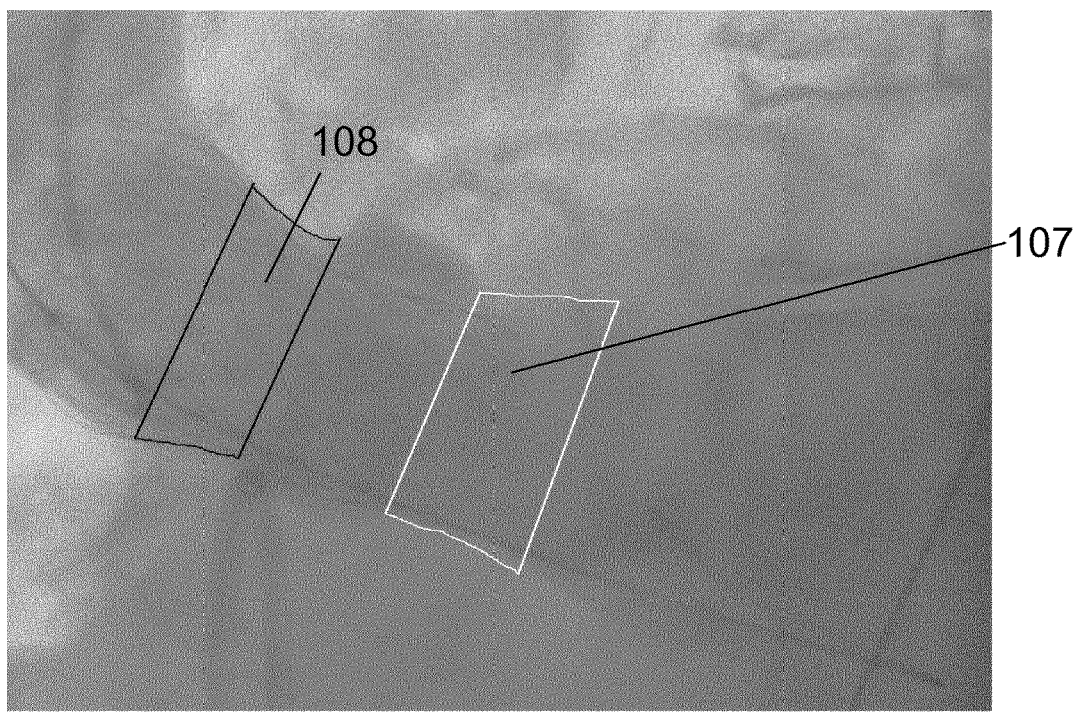
FIG. 3b shows an alternative manner of contour indication.

For the analysis, an area belonging to the left ventricle 6 is computed. This can be the entire left ventricle including the aortic root as for example contour 106 of FIG. 2 or a sub region within the left ventricle, for instance the left ventricle outflow tract as in contour 107 of FIG. 3b. This input contour 106, 107 can either be detected automatically by an algorithm as taught, for example, by Y. Jian et al, "X-ray image segmentation using active contour model with global constraints", In: IEEE Symposium on Computational Intelligence in Image and Signal Processing, 2007, CIISP 2007 p. 240-245), or manually been set by a user. The contour should be computed in a frame which shows the ventricle preferably in diastolic phase (FIG. 2).

2. Reference Area Detection

The method can use a control area residing somewhere in the image were a decent amount of contrast agent usually passes, for example at the start of the aorta 8, just behind the heart valve leaflets 7. This can result in a contour like the one indicated with ref. 108 in FIG. 3a or FIG. 3b. This reference can be compared and used to scale the measured contrast intensities in the left ventricle. Again, this can be detected automatically by the same algorithm by Y. Jian mentioned in step 1, or be indicated by the user.

3. Time-Density Curve Calculation

Figure 12:
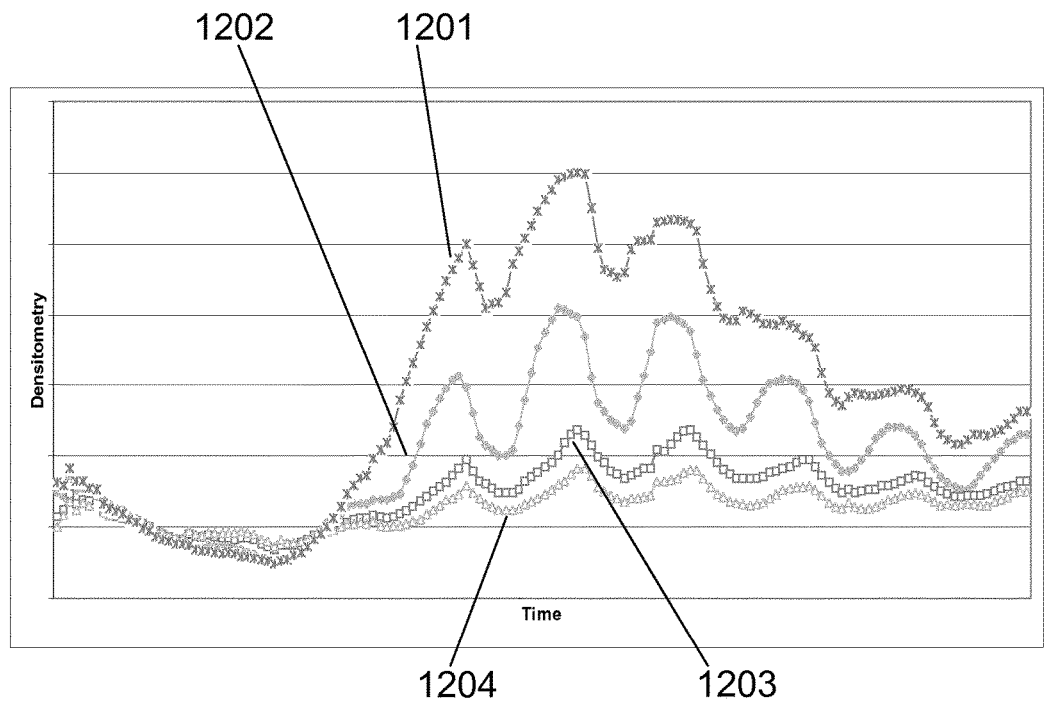
FIG. 12 shows densitometry curves of various regions within the ventricle to be analysed.

Time-density curves represent a time-evolution of pixel brightness of a sequence of images, particularly perfusion images. For accurate quantification, these curves (also called densitometry curves within the present disclosure) will be created, both for the ventricular area (step 1) and the reference area (step 2) as shown in FIG. 12.

The methods in which these curves are created differ though, as focus in both areas should be different. In the ventricle, it is quite important to remove static background effects, which might negatively impact the density curve calculation due to the movement of the ventricle, and causing unwanted effects in those curves. In the reference area, the main goal is to detect contrast injection, which justifies a slightly different approach, as explained below.

301a. Movement Correction

To perform AI analysis, the area belonging to the left ventricle 6 in FIG. 2 is better to be stabilized in position through the run of images. Breathing motion, patient movement and heart contraction all cause the left ventricle and the aorta to move in an image run. Movement correction will be done focused on a static landmark present in the aorta 8, for example an inserted stent around the aortic heart valve leaflets 7.

The landmark can be detected automatically by an algorithm such as the one taught by Y. Jian et al, "X-ray image segmentation using active contour model with global constraints", In: IEEE Symposium on Computational Intelligence in Image and Signal Processing, 2007, CIISP 2007 p. 240-245, or be indicated by the user.

Image stabilization is achieved by movement correction and can be done based on existing Gaussian or Fourier correlation methods such as in Chen, G. Y., Kegl, B., "Invariant pattern recognition using dual-tree complex wavelets and Fourier features", 2005, for example, resulting in a set of transformation vectors at each pixel position within the image run.

301b. Protocol Corrections on Pixel Intensity Variations

Before a start can be made in creating time-density curves, the image may be pre-processed. Every imaging modality has a certain amount of settings/protocols that can be used. Depending on the image modality that has been used to acquire the images, a protocol intensity correction can be present in the images.

For example, when X-ray images are used, some imaging protocols can vary the pixel intensities of the image as a reaction to the fact that contrast is present in certain frames. When contrast is administered, it appears as a black region in the image. As a reaction the pixel intensities of the image may vary to compensate for the contrast. Because the intensities change, more detail can be seen in the contrast region. However, the intensities of pixels that do not belong to the contrast region are also adjusted (for instance the background pixels). The elements of these pixels, however, did not change physiologically.

Because the assumption is made that the pixel density change over time is related to administered contrast, the protocol adjustment in pixel intensities has a negative influence on the time-density curves and can lead to erroneous quantifications.

Figure 14:
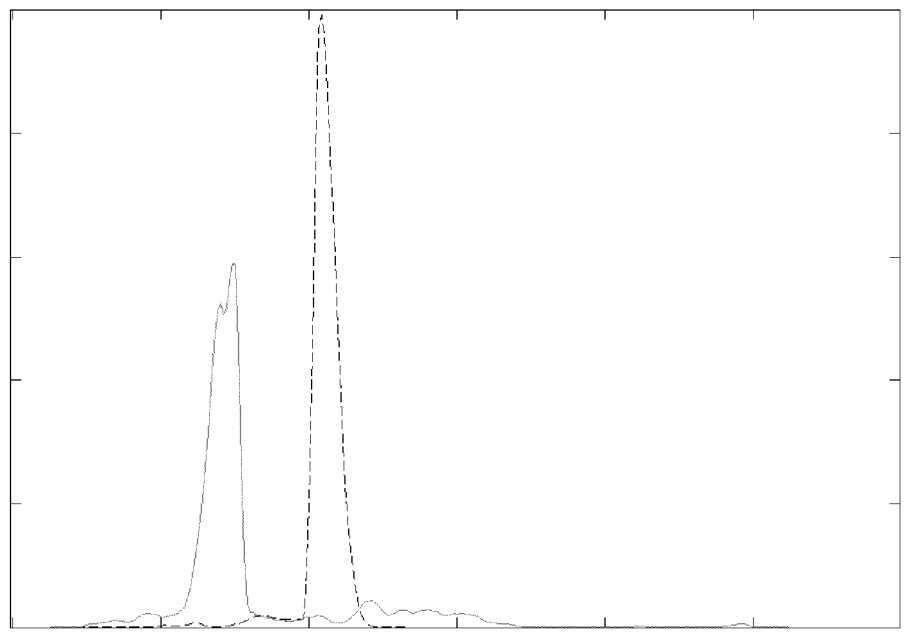
FIG. 14 shows an example of the histogram peak shift that can be induced by protocol pixel intensity corrections.

To adjust for this, histograms of the image densitometry of every frame are compared to the histogram of the image densitometry of the reference image. The reference image is chosen to be a frame before the start of contrast injection. As can be seen in FIG. 14 the pixel intensity correction due to the protocol causes the peak of the histogram to shift. Using the reference histogram, the peak of every frame is shifted back to compensate for the protocol adjustment. The corrected frames are then further used for calculations.

302. Time-Density Curve Calculation of Ventricular Area

As the spatial location within the left ventricle is just as important as actual total intensity within the ventricle to assess the severity of aortic regurgitation, the region calculated in the left ventricle (as defined under step 2) can be subdivided into several different regions. For this, the supplied left ventricular contour 106 is used as base input. For examples when the entire left ventricle including the aortic root is calculated, the contour can be subdivided into a number of basic ventricular areas (FIG. 3a) as indicated by 206, 306, 406 and a total region 506. These ventricular areas are based on general methods described in literature such as in Gelberg, H. J., Brundage, B. H., "Quantitative Left Ventricular Wall Motion Analysis: A Comparison of Area, Chord and Radial Methods", In: Circulation, vol 59, no 5, May 1979, p. 991-1000.

The time density curves within the left ventricle are derived within these sub regions from augmented pre-processed images obtained using the image sequence as input data. As angiographic X-ray imaging is a projection imaging method, the left ventricle suffers from background effects for example due to the X-ray absorption of the spinal, or inserted devices such as catheters. To compute the time density which only results from the contrast fluid within the left ventricle, subtraction will be advantageously performed on the input image sequence before applying the movement correction. This will result in a drastic reduction of background effects. The time density computation within the left ventricle sub regions are based on a pre-processed image sequence:

$$I_{i_{LV}} = Corr(I_{mask} - I_i)$$

In which $I_i$ is an image i from film I, $I_{mask}$ is a mask created with the purpose of creating a densitometry image, Corr is a function which applies the transformation vectors as calculated in step 301*a* to an image, and $I_{i_{LV}}$ the resulting pre-processed image for the left ventricle which will be used to derive density curves from. As there is a complete film of images available, the sum of each ventricular region in each image will form a point on the density curves (FIG. 12).

The image densitometry ($I_{mask} - I_i$) is calculated using known methods as disclosed, for example, in Lehmkuhl, H., Machning, Th. ea, "Digital subtraction angiography: feasibility of densitometry evaluation of left ventricular volumes and comparison to measurements obtained by the monoplane arc-length-method", In: Computers in Cardiology 1993, p. 29-32. The background mask $I_{mask}$ used to create these densitometry images is based on the period before contrast injection, a period which is detected automatically using relative image intensities and the area detected in step 2. As relative image intensities change drastically at the moment of contrast injection in the reference area, a detectable peak or plateau in intensity forms around this moment, allowing definition of the period before contrast injection.

The protocol correction as described in step 301*b* is applied on $I_{i_{LV}}$ image sequence as calculated above.

Figure 15:
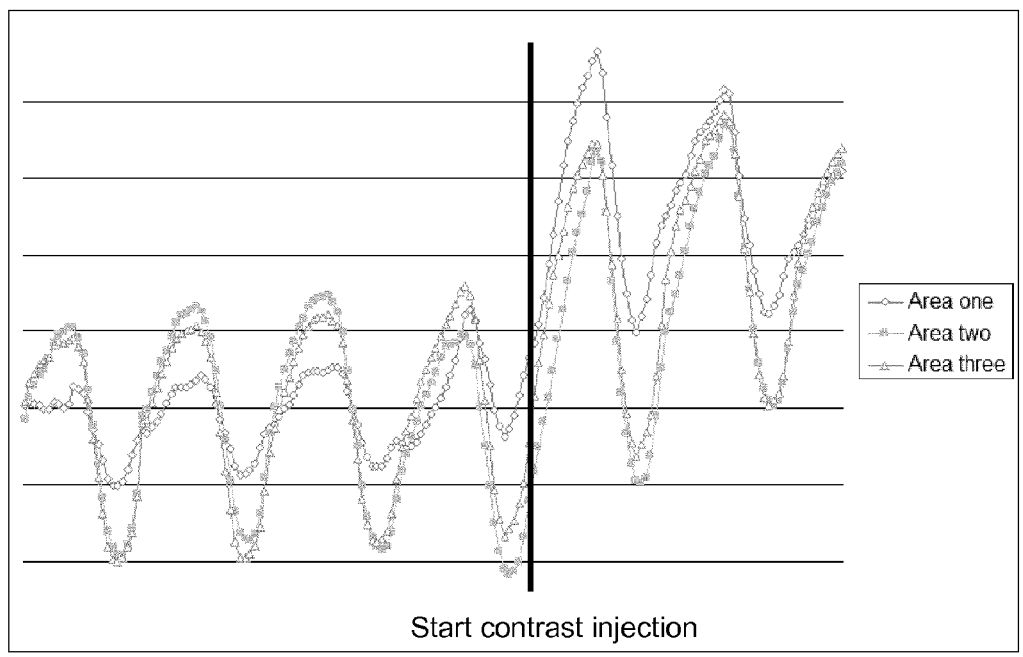
FIG. 15 shows an example of contrast changes due to the presence of contrast agent of previous sessions.

Once the time-density curve for the ventricular area has been calculated, a correction on the curve may be applied. During an intervention it is possible that contrast agent is admitted to the patient during multiple sessions. Because of this, (some) contrast agent of a previous session could still be present in the vascular system of the patient. Because the volume of the left ventricle changes while the absolute amount of contrast agent due to previous sessions does not, the density of the contrast fluid present in the image changes. This is visible in the time-density curve of the ventricular area as can be seen in FIG. 15.

The already present contrast agent has a negative result on the time-density curve(s) of this region. For instance, the regurgitation may seem more severe than the actual case. To account for this an average wave is calculated for each time-density curve of the frames before contrast injection. This wave is then subtracted periodically from the time-density curve.

303. Time-Density Curve Calculation of Aortic Area

The time density curve of the aortic region is derived from the reference area, as defined in step 2, from augmented pre-processed images obtained using the image sequence as input data. It is preferable that the reference area is stabilized for cardiac and/or breathing motion to form reliable density information of the amount of contrast present within this reference area. Because of this, movement correction can be applied before performing the subtraction to extract the density. Thus, pre-processed images will be created following:

$$I_{i_{Ref}} = I_{mask} - Corr(I_i)$$

In which $I_i$ is an image i from film I, $I_{mask}$ is a mask created with the purpose of creating a densitometry image, Corr is a function which applies the transformation vectors as calculated in step 301*a* to an image, and $I_{i_{Ref}}$ the resulting image for the reference area which will be used to derive density curves from. As there is a complete film of images available, the sum of the reference area in each image will form a point on the density curve (FIG. 12).

The image densitometry ($I_{mask} - Corr(I_i)$) is calculated using known methods as disclosed, for example, in Lehmkuhl, H., Machning, Th. ea, "Digital subtraction angiography: feasibility of densitometry evaluation of left ventricular volumes and comparison to measurements obtained by the monoplane arc-length-method", In: Computers in Cardiology 1993, p. 29-32. The background mask $I_{mask}$ used to create these densitometry images is created using the same method as described in step 302.

The protocol correction as described in step 301*b* is applied on/image mage sequence as calculated above.

4. AI Classification

The analysis is based, for example, on the following parameters:

The penetration of the regurgitation jet stream in the left ventricle; an indication how far the contrast agent reaches.

The duration of the presence of the contrast agent in the left ventricle.

The amount of contrast agent in the left ventricle.

The steepness of the intensity curve; the speed in which the contrast agent spreads through the left ventricle.

The contrast changes during a heartbeat.

The period contrast decay in the time density of the aortic area.

The input for this AI quantification are typically two sequences of pre-process images and the time-density curves derived from those images as described in step 3.

The measurements are scaled for differences in the amount of added contrast by taking the control contrast area into account. In the time density curves (FIG. 12), heart beats are detected by looking at peaks and valleys in the graphs, as heart contraction will cause a valley, while heart relaxation causes a peak, thus forming a single heart beat together. This detection is further enhanced by taking the heart rate into account in combination with the time between image acquisitions in the image run, or using a linked cardiograph, if any of those are available.

Figure 4:
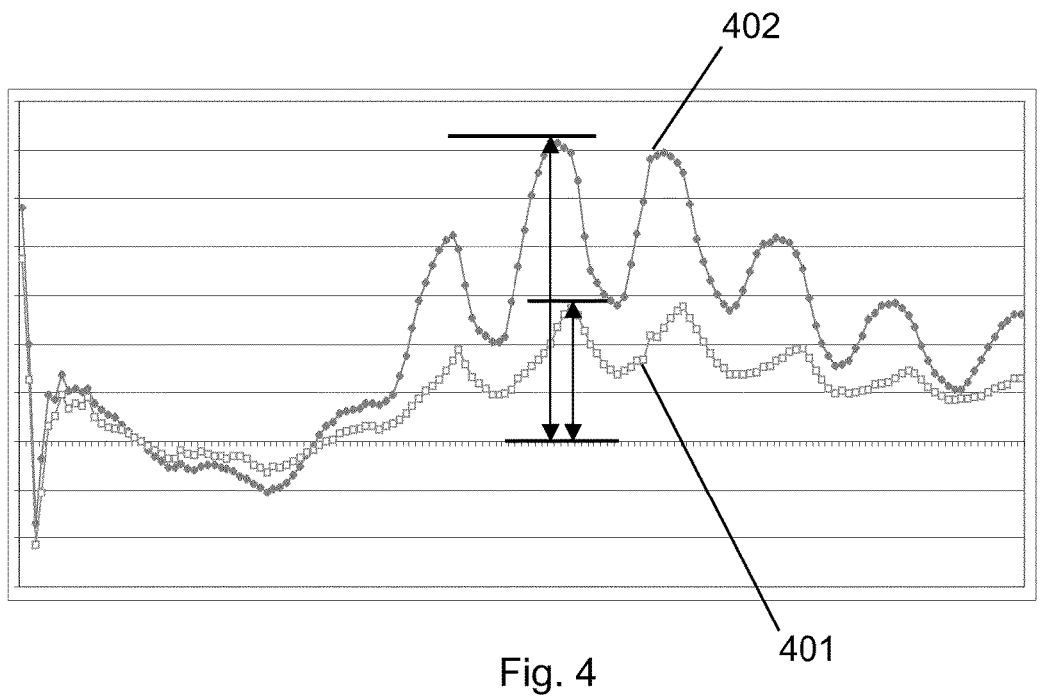
FIG. 4 shows two densitometry curves from different parts of the left ventricle.
Figure 5:
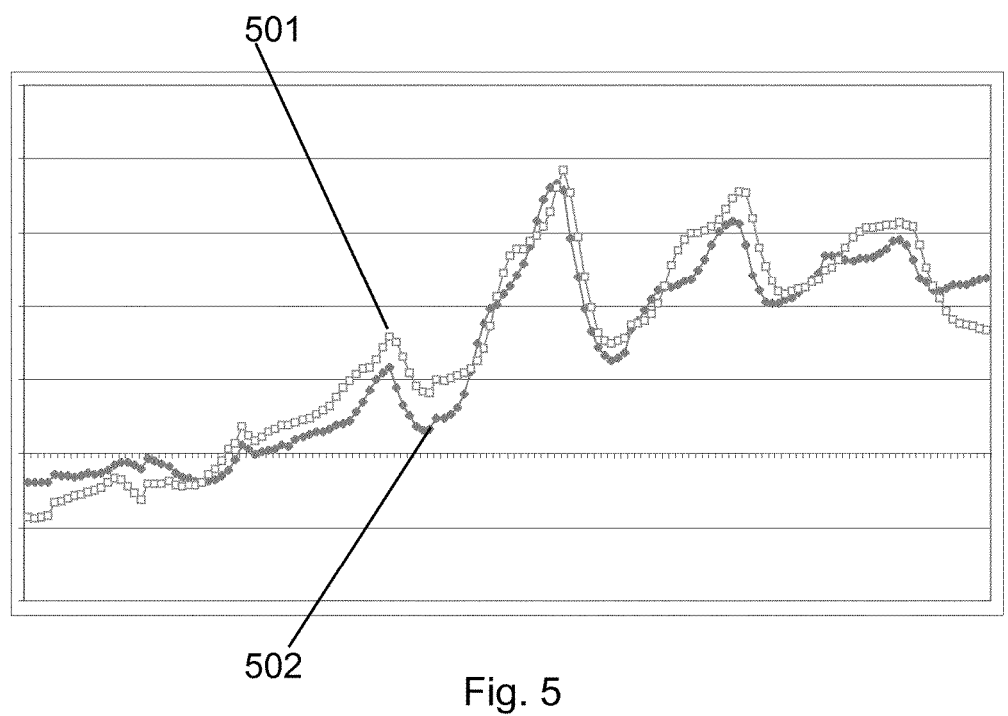
FIG. 5 shows two densitometry curves with mayor overlap despite originating from different parts of the left ventricle.
Figure 6:
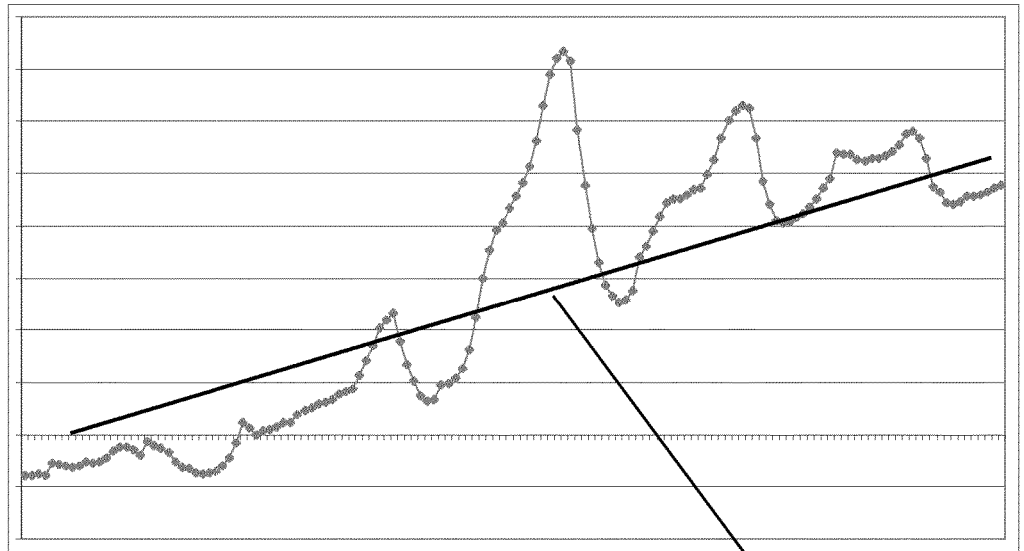
FIG. 6 shows a densitometry curve with increasing contrast agent in the left ventricle over time.

When, for example, the entire left ventricle is calculated, the penetration of the jet stream is measured by comparing the densitometry values over time and heart beats in different areas in the left ventricle. The areas further away from the heart valves (and thus closer to the apex such as region 406 in FIG. 3*a*) will show decreasing levels of densitometry (see arrows in FIG. 4: curve 401 is lower and relates to an area closer to the apex while curve 402 is higher and relates to an area close to the heart valves). In case densitometry levels close to the apex (region 406 in FIG. 3*a*) of the left ventricle are high (FIG. 5, curve 502, which relates to an area close to the apex, is just as high in densitometry as curve 501, which relates to an area close to the heart valves region 206 in FIG. 3*a*), this shifts the quantification towards severe levels of regurgitation, while absence of clear density increases compared to normal background levels shifts the quantification towards milder cases of regurgitation.

The duration of the presence of contrast agent in the left ventricle is measured by time-analysis of densitometry in the different defined areas in the image sequence (in the example shown in FIG. 12 curve 1202 relates to an area close to heart valves, curve 1203 to an area as middle region, curve 1204 to an area close to the apex, while curve 1201 relates to the reference area). If high amounts of contrast remain during heart beats, the severity of the regurgitation is higher, as the left ventricle has insufficient blood flow away from the ventricle (accumulation of contrast agent, illustrated in FIG.

Figure 7:
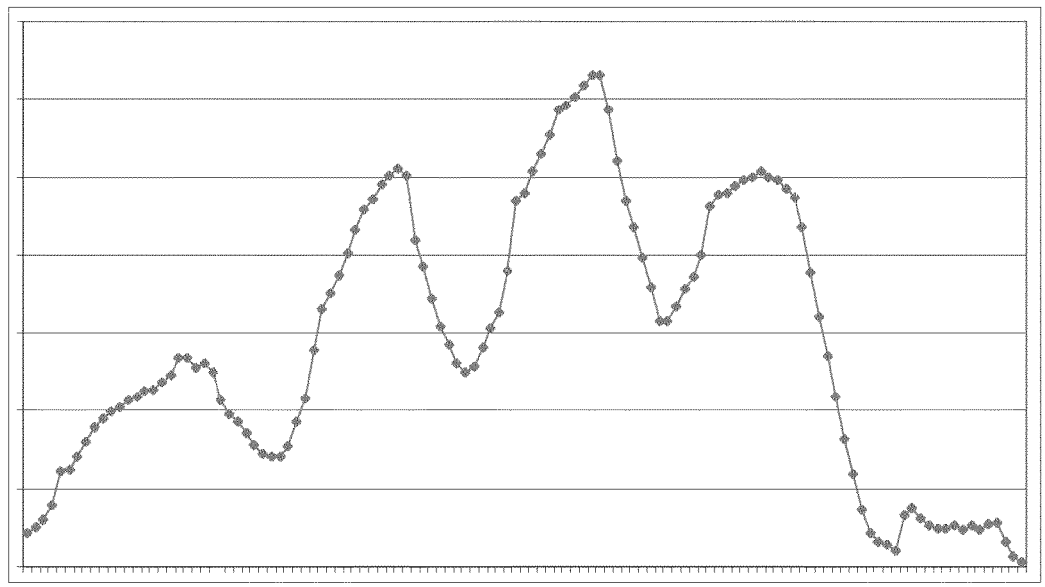
FIG. 7 shows a densitometry curve in which contrast agent outflow occurs after a number of heart contractions.

6, with an increasing trend line 601 fitted to the data). In case no significant intensity remains after the first systole heart phase after contrast injection, this would indicate little or no regurgitation (large washout of contrast, illustrated in FIG. 7). In case high levels of contrast remain for more than three heart beats after contrast injection, this shifts classification to high levels. Cases in between will indicate severity levels in between. As explained at the start of this step, heart beats are detected automatically, and integrals and partial integrals of the time density curves, as well as comparisons of contrast present after multiple heart beats compared to the reference area are used to quantify this parameter.

Figure 8:
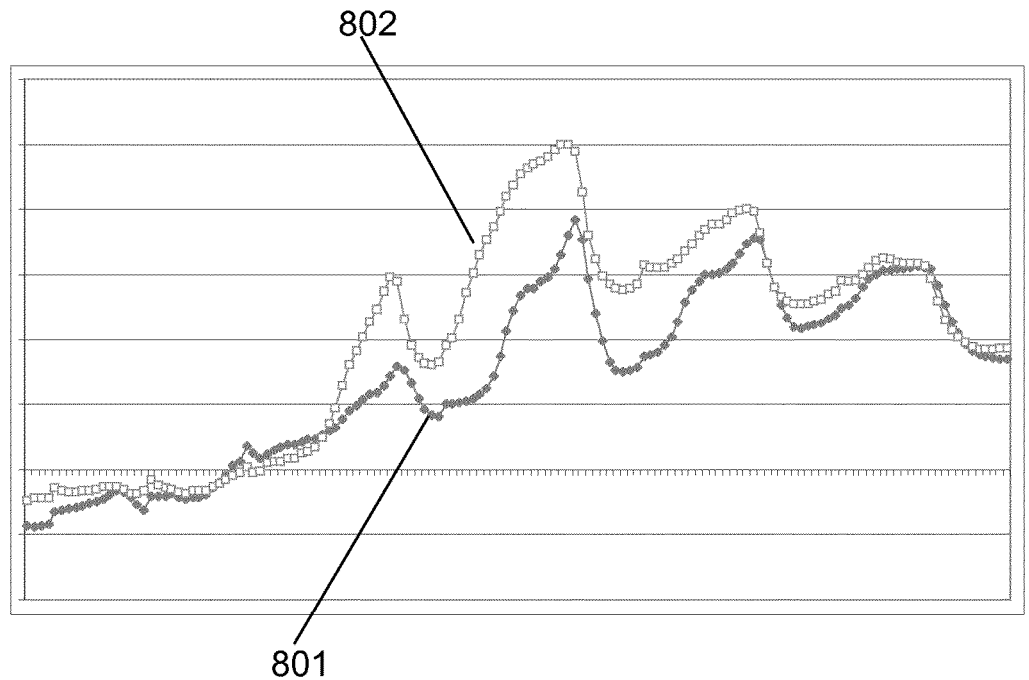
FIG. 8 shows two densitometry curves in which the ventricular curve is close to the reference curve: a sign of high regurgitation.
Figure 9:
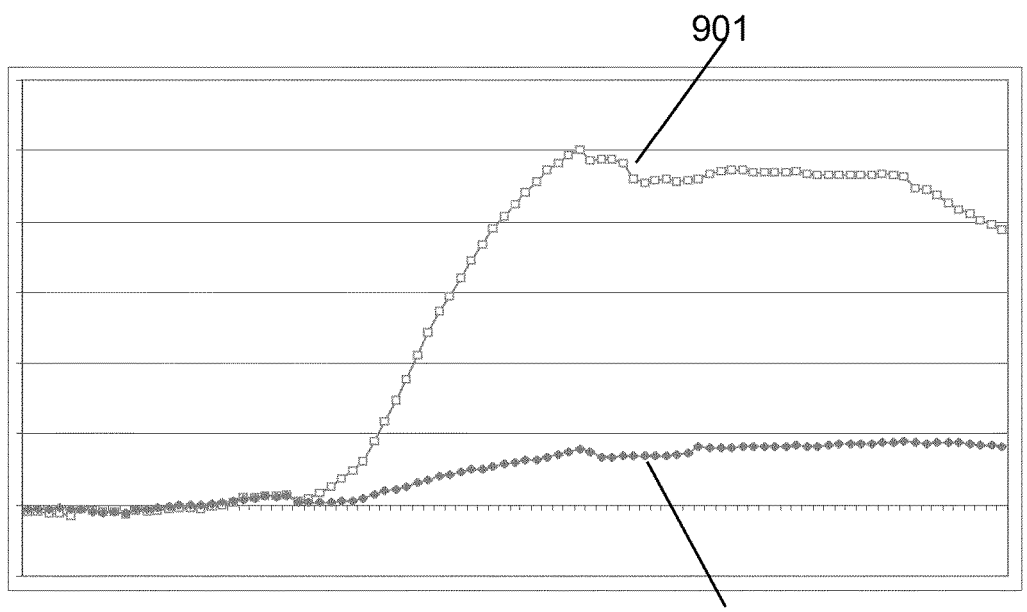
FIG. 9 shows two densitometry curves in which the ventricular curve hardly shows any reaction to contrast agent injection: a sign of low regurgitation.

The total amount of contrast agent present in the left ventricle, after correction as done in step 302, is directly related to the combined maximal intensities in the left ventricle area(s) and the maximal densitometry in the control area. In case these are more or less similar, this indicates a severe case of regurgitation (FIG. 8, reference graph 802 is very similar to ventricular graph 801), as in a healthy situation, no contrast agent should be present in the ventricle at all (minor regurgitation might have a minor effect, as illustrated in FIG. 9, in which ventricular graph 902 hardly shows any reaction to the contrast increase in reference graph 901), as all is contained by the heart valves. All cases between these extremes are scaled according to densitometry, again using the comparison of heart beat integrals and integrals over complete curves of ventricular areas compared to the control area.

Figure 10:
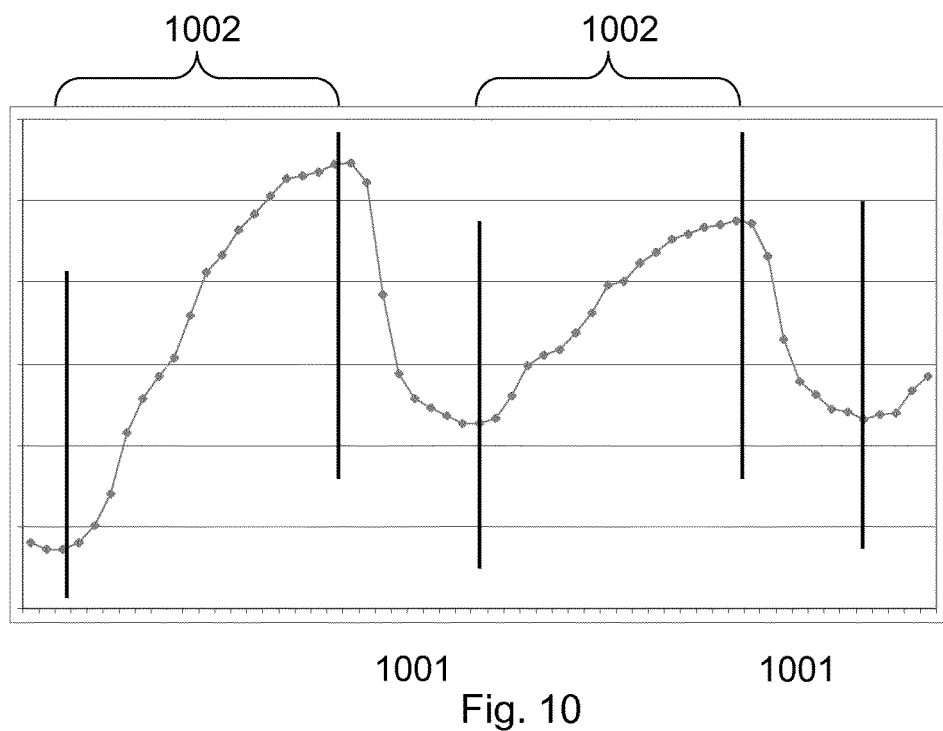
FIG. 10 shows a densitometry curve with shallow uptakes and steep downfalls.

The speed in which the contrast agent spreads through the left ventricle is measured by analyzing the speed of changes of densitometry (the steepness of the densitometry curve) within the time-density curves. The time-density curve has two important parts: the ascending densitometry part (before the densitometry maximum) and the descending densitometry part. A steep curve in the ascending densitometry part indicates higher regurgitation quantification, while a steep curve in the descending densitometry part indicates lower regurgitation quantification. FIG. 10 illustrates a shallow ascending densitometry curve 1002, with a steep descending densitometry 1001. Both steepness factors are weighted in the final quantification.

Figure 11:
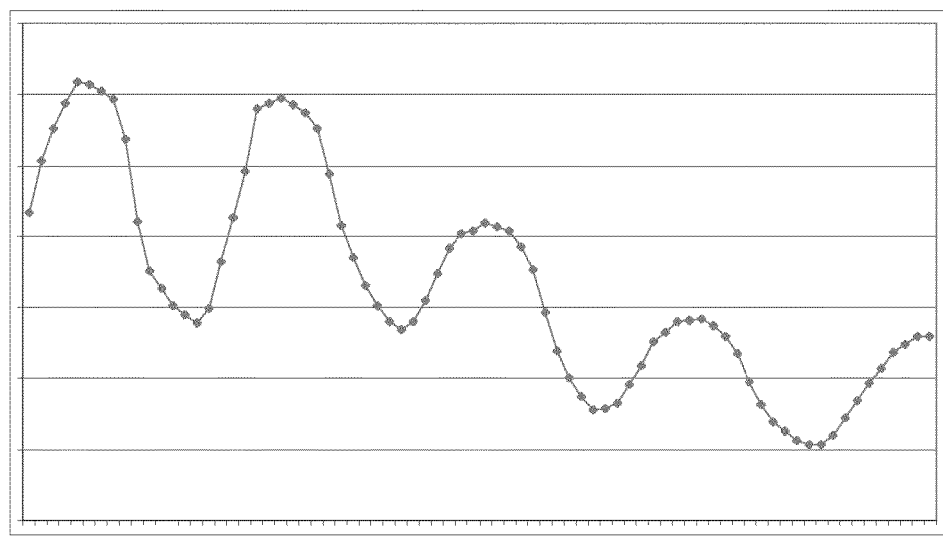
FIG. 11 shows a densitometry curve with a high inflow, but a higher outflow.

The changes of contrast agent in areas during a single heart beat give a more detailed view of regurgitation. Lower end densitometry values indicates a general outflow, while large inflows of contrast might be not as bad when compensated for by large outflows of contrast. FIG. 11 illustrates a large inflow compensated for by a larger outflow. Specifically, the parameters considered here include the general increase and decrease of contrast during a heart beat, and the partial integral (the integral taking the densitometry at the start of the heart beat as base level).

The period contrast decay in contrast fluid in the time-density curves provides an insight in the presence of regurgitation. Only when regurgitation is present, the time-density curve from the aorta shows a period decay of contrast fluid. Furthermore, a period signal within the left ventricular is present in case of aortic regurgitation.

Therefore on at least the aortic time-density curve a Fast Fourier Transform is calculated. Per time-density curve the complex magnitude of frequencies corresponding to the cardiac cycle is calculated, by computing the integral using the composite trapezoid method as described in Michael R. King, Nipa A. Mody, "Numerical and Statistical Methods for Bioengineering: applications in MATLAB", chapter 6, ISBN 9780521871587, Cambridge University Press, 2011.

The total quantification weighs the values mentioned above and generates a quantitative regurgitation parameter as output.

Figure 13:
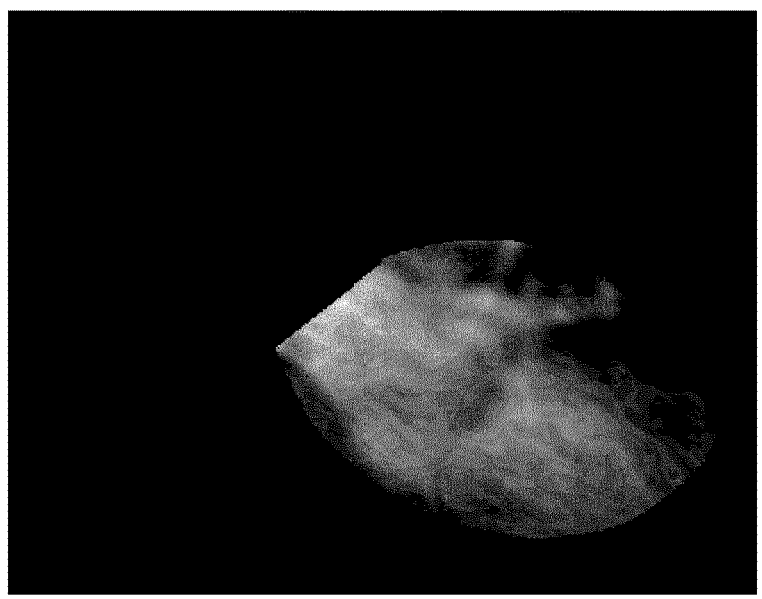
FIG. 13 shows an example in which the regurgitation within the left ventricle is visualized by means of a 2D colour map.

FIG. 13 shows an example in which the regurgitation within the left ventricle is visualized by means of a 2D colour map, combining the results as shown in FIG. 12 with its spatial position related to the left ventricle. The regurgitant flow can, in fact, be visualized by means of a colour map obtained by the time intensity curves and/or parameters related to such time intensity curves. This can be achieved, for example, by computing within each pixel within the left ventricle, the integral of the time density curve scaled to the reference. In the given example, the basal region shows more regurgitation compared to the apical region of the left ventricle. This way of presenting the outcome of the method of the present invention is very powerful. Regurgitation maps can, in fact, be displayed overlaid, for example by varying the opacity, with the input images or with related images, either registered or not, such as those obtained from a different imaging modality, thus providing an immediate overview of insufficiency. Regurgitation maps can be presented statically, for example, as the total integral of the time density curve scaled to the reference or dynamically, for example, by displaying the sub integral of the time density curve related to the frame being viewed. The representation of time-density curves as colour maps can obviously be achieved independently from any parameter determination and thus numeric indication of insufficiency according to the present invention.

The invention claimed is:

1. Method for assessing a regurgitant flow through a valve into a moving object of interest from a sequence of consecutive two-dimensional (2D) X-ray images of such moving object of interest, which 2D X-ray images are timely separated by a certain time interval, the method comprising:
   a) identifying in the 2D X-ray images the moving object of interest;
   b) augmenting the 2D X-ray images to stabilize position of the moving object of interest in the 2D X-ray images in order to correct for motion of the moving object of interest in the 2D X-ray images, wherein the motion is selected from the group consisting of cardiac motion, breathing motion, patient motion and combinations thereof;
   c) making a time-analysis of the augmented 2D X-ray images of b) to obtain at least one time-density curve, wherein the at least one time-density curve represents a time-evolution of pixel brightness;
   d) determining a plurality of parameters related to such at least one time-density curve; and
   e) weighting such parameters to provide indications on the regurgitant flow through the valve.

2. Method according to claim 1, further comprising:
detecting the contour of the object of interest.

3. Method according to claim 1, further comprising:
detecting an area in at least one of said 2D X-ray images, wherein the area is used as a reference for time density curve determination of c).

4. Method according to claim 3, wherein:
said area is located on a zone of the at least one 2D X-ray image where a forward flow from the object of interest through the valve is identified.

5. Method according to claim 3, wherein:
the augmenting of the 2D X-ray images comprises performing motion correction before background correction for the purpose of calculating at least one time-density curve for said area.

6. Method according to claim 1, further comprising correcting the at least one time-density curve for previous contrast sessions.

7. Method according to claim 1, further comprising:
dividing the object of interest into areas that vary in distance relative to the valve, wherein said areas include one area relatively closer to the valve and another area relative further from the valve.

8. Method according to claim 1, wherein:
the augmenting of the 2D X-ray images comprises detecting at least one landmark on one 2D X-ray image and following such landmark on other 2D X-ray images to correct for the motion of the object of interest in the 2D X-ray images.

9. Method according to claim 1, wherein:
the augmenting of the 2D X-ray images comprises performing background correction before motion correction for the purpose of calculating the at least one time-density curve of the object of interest.

10. Method according to claim 1, further comprising:
selecting the time interval, wherein the consecutive 2D X-ray images in the selected time interval are used for making the assessment of the regurgitant flow.

11. Method according to claim 1, wherein:
the valve is located between a first organ and a second organ, the valve being configured to allow a forward flow of a fluid from the first organ to the second organ and to prevent the reverse flow from the second organ to the first organ, the first organ being the moving object of interest.

12. Method according to claim 11, wherein:
the regurgitant flow is identified when at least one time-density curve shows an increase in pixel densitometry followed by a decrease, such increase being related to the presence of a fluid leaking through the valve from the second organ into the first organ while such decrease is related to such fluid leaving the first organ during forward flow.

13. Method according to claim 1, further comprising:
determining as a parameter the jet stream penetration of the regurgitant fluid by comparing the densitometry values over time in different areas of the object of interest.

14. Method according to claim 1, further comprising:
determining as a parameter the duration of the presence of contrast agent in the object of interest or in one or more areas of the object of interest.

15. Method according to claim 1, further comprising:
determining as a parameter the total amount of contrast agent present in the object of interest by comparing the maximal densitometry in at least one of i) the whole object of interest and ii) one or more areas of the object of interest with maximal densitometry in a reference area.

16. Method according to claim 1, further comprising:
determining as a parameter the steepness of one or more time-density curves or contrast changes during a heartbeat.

17. Method according to claim 1, further comprising:
combining the plurality of parameters to derive a classification of the severity of the regurgitant flow.

18. Method according to claim 1, wherein:
the object of interest is the left ventricle and the valve is the aortic valve, and the 2D X-ray images represent a cine of 2D X-ray images of the left ventricle taken in sequence.

19. Method according to claim 1, further comprising:
visualizing the regurgitant flow by means of a colour map obtained by the time intensity curves and/or parameters related to such time intensity curves.

20. A non-transitory computer readable medium storing a computer program for performing the method according to claim 1 when the computer program product is run on a computer.

21. X-ray apparatus for acquiring two dimensional images, the apparatus configured to obtain a cine of consecutive two-dimensional X-ray images of the left ventricle of a patient, the apparatus further comprising at least one processor configured to perform the method according to claim 1 to determine a classification of the regurgitant flow through the aortic valve of the patient.

22. Apparatus according to claim 21, wherein:
the cine of consecutive two-dimensional X-ray images follow a trigger event, the trigger event being the administration of a contrast agent in the aortic root of the patient.

23. Method according to claim 1, further comprising:
prior to c), processing 2D X-ray images to correct for variations in imaging protocol.

24. Method for assessing a regurgitant flow through a valve into a moving object of interest from a sequence of consecutive two-dimensional (2D) X-ray images of such moving object of interest, which such 2D X-ray images are timely separated by a certain time interval, the method comprising:
a) identifying in the 2D X-ray images the moving object of interest;
b) dividing the object of interest into areas that vary in distance relative to the valve, wherein said areas include one area relatively closer to the valve and another area relatively further from the valve;
c) augmenting the 2D X-ray images to stabilize position of the moving object of interest in the 2D X-ray images in order to correct for motion of the moving object of interest in the 2D X-ray images, wherein the motion is selected from the group consisting of cardiac motion, breathing motion, patient motion and combinations thereof;
d) making a time-analysis of the augmented 2D X-ray images of c) in said areas to obtain a time-density curve for each area, wherein the time-density curves for the areas of the object of interest represent a time-evolution of pixel brightness;
e) determining a plurality of parameters related to such time-density curves; and
f) weighting such parameters to provide indications on the regurgitant flow through the valve.

25. Method according to claim 24, further comprising:
prior to d), processing 2D X-ray images to correct for variations in imaging protocol.

* * * * *